United States Patent
Kuhtz et al.

(10) Patent No.: US 10,210,170 B2
(45) Date of Patent: Feb. 19, 2019

(54) CHUNK STORAGE DEDUPLICATION USING GRAPH STRUCTURES

(71) Applicant: Microsoft Technology Licensing, LLC, Redmond, WA (US)

(72) Inventors: Lars Kuhtz, Seattle, WA (US); John Thomas Erickson, Mercer Island, WA (US); Sudipta Sengupta, Redmond, WA (US); Vinod Sridharan, Bellevue, WA (US); Xianzheng Dou, Ann Arbor, MI (US); Wolfram Schulte, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

(21) Appl. No.: 15/418,704

(22) Filed: Jan. 28, 2017

(65) Prior Publication Data

US 2018/0218005 A1    Aug. 2, 2018

(51) Int. Cl.
| G06F 17/30 | (2006.01) |
| G06F 7/00 | (2006.01) |
| G06F 8/41 | (2018.01) |
| G06F 8/72 | (2018.01) |
| G06F 8/71 | (2018.01) |

(52) U.S. Cl.
CPC ......... *G06F 17/30159* (2013.01); *G06F 8/44* (2013.01); *G06F 8/71* (2013.01); *G06F 8/72* (2013.01); *G06F 17/30958* (2013.01)

(58) Field of Classification Search
CPC ........ G06F 17/30159; G06F 8/72; G06F 8/44; G06F 17/30958
USPC ....................................................... 707/692
See application file for complete search history.

(56) References Cited

U.S. PATENT DOCUMENTS

| 4,309,569 A | 1/1982 | Merkle |
| 7,519,635 B1 | 4/2009 | Haustein et al. |
| 8,397,080 B2 | 3/2013 | Lu et al. |

(Continued)

OTHER PUBLICATIONS

Srinivasan, et al., "iDedup: Latency-aware, inline data deduplication for primary storage", In Proceedings of 10th Usenix Conference on File and Storage Technologies, Published on: Feb. 14, 2012, 14 pages.

Tarasov, et al., "Generating Realistic Datasets for Deduplication Analysis", In Proceedings of Usenix Annual Technical Conference, Jun. 13, 2012, pp. 1-12.

(Continued)

*Primary Examiner* — Kuen S Lu
(74) *Attorney, Agent, or Firm* — Ogilvie Law Firm

(57) ABSTRACT

Deduplication is integrated with software building and chunk storing. A dedup module includes dedup software, a build graph interface, and a chunk store interface. A dedup graph includes a portion of the build graph, and a portion that represents build artifact file chunks. The dedup software queries whether chunks are present in the chunk store, submits a chunk for storage when the chunk is not already present, and avoids submitting the chunk when it is present. Queries may use hash comparisons, a hash tree dedup graph, chunk expiration dates, content addressable chunk store memory, inference of a child node's presence, recursion, and a local cache of node hashes and node expiration dates, for example. A change caused by the build impacts fewer dedup graph nodes than directory graph nodes, resulting in fewer storage operations to update the chunk storage with new or changed build artifacts.

20 Claims, 7 Drawing Sheets

(56) References Cited

U.S. PATENT DOCUMENTS

| | | | |
|---|---|---|---|
| 8,874,532 | B2 | 10/2014 | Anglin et al. |
| 8,965,854 | B2 | 2/2015 | Provenzano et al. |
| 9,158,787 | B2 | 10/2015 | Klose |
| 9,251,198 | B2 | 2/2016 | Mutalik et al. |
| 9,262,431 | B2 | 2/2016 | Kolodner et al. |
| 9,336,143 | B1 | 5/2016 | Wallace et al. |
| 9,396,006 | B2 | 7/2016 | Kundu et al. |
| 9,432,192 | B1 * | 8/2016 | Pogde .................. H04L 9/0836 |
| 10,007,445 | B2 * | 6/2018 | Nithrakashyap ...... G06F 3/0619 |
| 2010/0070698 | A1 * | 3/2010 | Ungureanu ....... G06F 17/30067 |
| | | | 711/108 |
| 2012/0166401 | A1 | 6/2012 | Li et al. |
| 2012/0166448 | A1 | 6/2012 | Li et al. |
| 2013/0339319 | A1 | 12/2013 | Woodward et al. |
| 2014/0280664 | A1 | 9/2014 | Sengupta et al. |
| 2016/0275125 | A1 * | 9/2016 | Drobychev ....... G06F 17/30575 |
| 2017/0123711 | A1 * | 5/2017 | Kathpal ................ G06F 3/0641 |

OTHER PUBLICATIONS

Juan Benet, "IPFS—Content Addressed, Versioned, P2P File System (DRAFT 3)", from <<https://github.com/ipfs/papers/raw/master/ipfs-cap2pfs/ipfs-p2p-file-system.pdf>>, no later than Dec. 13, 2016, 11 pages.

"Content-addressable storage", from <<https://en.wikipedia.org/wiki/Content-addressable_storage>>, Jun. 29, 2016, 5 pages.

Leslie Johnston, "A 'Library of Congress' Worth of Data: It's All in How You Define It", from <<https://blogs.loc.gov/thesignal/2012/04/a-library-of-congress-worth-of-data-its-all-in-how-you-define-it/>>, Apr. 25, 2012 , 2 pages.

"Merkle tree", from <<https://en.wikipedia.org/wiki/Merkle_tree>>, Oct. 28, 2016, 4 pages.

"Is Git a Block Chain?", from <<https://news.ycombinator.com/item?id=9436847>>, 2015, 7 pages.

* cited by examiner

CHUNK STORAGE DEDUPLICATION USING GRAPH STRUCTURES

BACKGROUND

Noon Application programs, operating systems, libraries, symbol files, packages, and many other useful digital artifacts can each be viewed as the output of a software build process. In a commercial or institutional development environment or production environment, the sheer size of the artifacts that are produced or used during one or more builds can be immense. Some commercial software vendor development teams, for example, produce several petabytes of raw output in a single day. For comparison, in 2012 the U.S. Library of Congress had about 3 petabytes of digital collections.

From a developer's point of view, the build output is often organized into files that are stored in a hierarchy of directories in a file system. An underlying storage system which helps implement the file system may break file contents into chunks or blocks that are smaller than a file. Then the chunks or blocks are individually stored, along with information about which chunks or blocks belong to which file or files. Different files which share some identical content may sometimes be stored in less space than would be needed to keep a separate complete copy of each file, by keeping only a single copy of a chunk or block whose content is shared by two or more files.

SUMMARY

Some technologies described herein are directed to the technical activity of identifying chunks or blocks whose content has already been stored in a chunk or block storage system. The terms "chunk" and "block" are used interchangeably herein to mean a portion of a file which is generally but not always less than the entire file. A file may be kept as a sequence of chunks. In this case, a chunk is a sub-file unit in a storage system. Although many files will include a sequence of multiple chunks, some files may be small enough to fit in a single chunk. A file may also be kept as a base plus zero or more deltas from that base; this is known as "delta encoding". When delta encoding is used, a chunk may include the base version of a file, or a chunk may include a delta from the base version or a delta from a later version of the file. Some of the technologies herein are directed to reducing storage system operations such as presence queries or uploads involving artifacts that are created or updated during a software build. Other technical activities pertinent to teachings herein will also become apparent to those of skill in the art.

In some embodiments, build chunk deduplicating is integrated with software building and with chunk storing. A dedup graph module includes dedup software, a build interface, and a storage interface. The build interface provides the dedup software with access to a build graph which defines dependencies for a software build. The storage interface provides the dedup software with access to a chunk store. The dedup graph includes a build shadow portion which has nodes and links matching at least a portion of the build graph. The dedup graph also includes a chunk portion which has chunk nodes with links to at least one build artifact file node of the build shadow portion. The chunk nodes represent chunks which contain digital content of a build artifact file represented by the build artifact file node. In operation, the dedup software queries the chunk store to ascertain whether chunks represented by the chunk nodes are present in the chunk store. The dedup software submits a chunk for storage in the chunk store when the chunk is not already present, and avoids submitting the chunk for storage in the chunk store when the chunk is already present.

In some embodiments, queries may be performed using one or more of the following: dedup graph node hash comparisons to identify changes caused by a build, a hash tree dedup graph, chunk expiration dates, content addressable memory in the chunk store, inference of a child node's presence in the chunk store based on the presence of a parent or higher node, recursive queries, a local cache of node hashes and node expiration dates, a dedup service, and chunk expiration date extensions, for example. The dedup graph does not necessarily have the same structure as a file system directory graph for the build, so a change caused by the build may impact fewer dedup graph nodes than directory graph nodes, resulting in fewer storage operations to update the storage with new or changed build artifacts. Storage operations directed using the dedup graph may be performed concurrently with software build operations.

In some embodiments, the dedup graph facilitates efficient choices between storage-compute-network options. For instance, the dedup graph efficiently identifies which pieces needed to complete a build are not present locally, and these very pieces are the most relevant pieces when a calculation is performed to determine whether pieces should be retrieved over a network or should instead be recomputed locally. Also, the dedup graph efficiently identifies which items are changed by a build, and these are the most relevant pieces when a calculation is performed to determine whether changed pieces should be sent over a network to remote storage or should instead be recomputed later as needed. Moreover, the dedup graph corresponds to the build graph and therefore aids storage-compute-network tradeoff choices by providing the option of storing a description of how to (re)compute a build piece instead of storing the build piece itself. The description may include a copy of part of the build graph, or may reference into a previously stored copy of the build graph.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
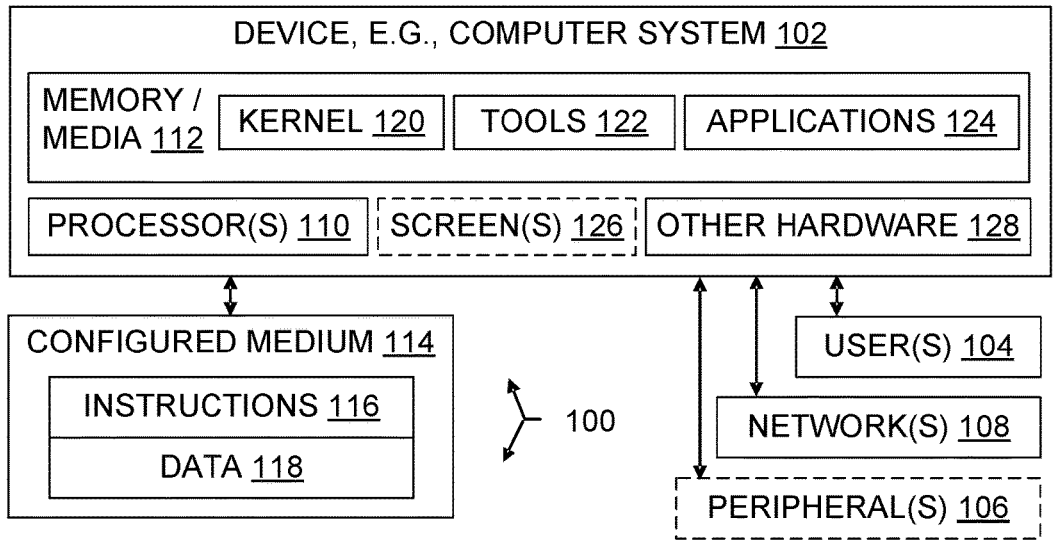
FIG. 1 is a block diagram illustrating a computer system having at least one processor and at least one memory which interact with one another under the control of software, and also illustrating some configured storage medium examples.

A software build process often has many binary outputs, e.g., libraries, executables, symbols, and packages. The size of the raw outputs can be startling; they can measure in petabytes per day for some development teams. That said, there is sometimes a high amount of duplication between these binaries, particularly when the underlying source code has relatively few changes from build to build. With development teams striving for gated check-ins and shorter release cycles, the amount of pressure on the storage system is growing dramatically. Specifically, a challenge for deduplication of these large data sets is that even just tracking a chunk index can become daunting; it takes 15 billion 64 KB chunks to form one petabyte.

The present disclosure describes and illustrates solutions that leverage the hierarchical and incremental nature of the software build systems to reduce the number of storage operations needed. The reduction may be from a number of storage operations that is proportional to the total number of files in a build, down to a number of storage operations that is proportional to the amount of change in the build, e.g., the number of changed file chunks. Specifically, by a deduplicating process which shadows (e.g., partially mirrors) the causal dependency graph of the build workflow, some embodiments reduce or even minimize the number of churned nodes in a hash tree representation of the build's transformations.

In some embodiments, a build engine has this storage deduplication functionality. A client in the build engine interacts by a shadowing protocol with a dedup service that implements the other side of the protocol to reduce storage operations.

More generally, tools and techniques taught herein can be used to apply deduplication of stored data and deduplication of storage system queries to any set of data wherein the different pieces of the data are connected via transformations that are defined in a directed graph such as a build graph. Other applications of this work could include, for example, map-reduce processes and database queries.

Some embodiments described herein may be viewed in a broader context. For instance, concepts such as building, deduplication, graphs, querying, shadowing, and storing may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving building, deduplication, graphs, querying, shadowing, or storing are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical activities that are rooted in computing technology, such as detecting changes when building software, storing changed artifacts of a software build, and querying whether portions of software build artifacts have already been stored in a digital storage such as a content addressable memory. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein construct and utilize a dedup graph, a node queue, expiration date caches and queries, and other tailored data structures and operations. Third, technical effects and advantages provided by some embodiments include a reduction in query operations to a chunk storage system and a reduction in the number of copies of chunk content when updating storage with software build artifacts. Fourth, some embodiments include technical adaptations such as a dedup graph in the form of a directed acyclic graph with hashes that mirrors a build graph, and dedup software which interfaces with both a build system and a chunk storage system.

Fifth, some embodiments modify the technical functionality of a computing environment to improve efficiency by adding deduplication functionally located between a build system and a storage system. Other advantages will also be apparent to one of skill from the description provided.

Acronyms and Abbreviations

Some acronyms and abbreviations are defined below. Others may be defined elsewhere herein or require no definition to be understood by one of skill.

ALU: arithmetic and logic unit
AMD64: Advanced Micro Devices® 64-bit computing platform
API: application program interface
APP: application
BIOS: basic input/output system
CAM: content addressable memory
CD: compact disc
CPU: central processing unit
DAG: directed acyclic graph
DC: datacenter
dedup: deduplication
DVD: digital versatile disk or digital video disc
FPGA: field-programmable gate array
FPU: floating point processing unit
GPU: graphical processing unit
GUI: graphical user interface
HDD: hard disk drive (e.g. solid state, electromechanical, optical)
I32: Intel® 32-bit computing platform
I/O: input/output
LIB: library
LSB: least significant byte
OEM: original equipment manufacturer
OS: operating system RAM: random access memory
ROM: read only memory
TBR: time-based reference
Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to emphasize that a given chip may have one or more processors; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, and similar hardware interface software. BIOS code and similar code such as firmware may be considered functionally part of a kernel.

"Code" means processor instructions, data (which includes constants, variables, and data structures), or both instructions and data. "Code" and "software" are used interchangeably herein. Executable code, interpreted code, and firmware are some examples of code.

"Logic" may include special-purpose hardware or software or firmware, for example.

"Memory" means digital storage. Examples include, without limitation, RAM, ROM, HDD, DVD, flash, CAM, and other digital storage, whether volatile or not, whether removable or not, and whether local to a chip, to a board, to a machine, to a cluster, or not local.

"Optimize" means to improve, not necessarily to perfect. For example, it may be possible to make further improvements in a program or an algorithm which has been optimized.

"Program" is used broadly herein, to include applications, kernels, drivers, interrupt handlers, firmware, state machines, libraries, and other code written by programmers (who are also referred to as developers) and/or automatically generated.

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"Service" means software in a computing environment which provides functionality or computing resource access to multiple application programs.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

A "hypervisor" is a software platform that runs virtual machines. Some examples include Xen® (mark of Citrix Systems, Inc.), Hyper-V® (mark of Microsoft Corporation), and KVM (Kernel-based Virtual Machine) software.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense). "Procedure" is used interchangeably with "process".

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as computing and using multi-byte hash values in a domain which includes thousands or even millions of items identified by hashes are understood herein as requiring speed and accuracy that are not obtainable by human mental steps, in addition to their inherently digital nature. This is understood by persons of skill in the art but others may sometimes need to be informed or reminded of that fact.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, asking, avoiding a step, building, caching, comparing, deduplicating, determining, downloading, extending, identifying, inferring, obtaining, placing, processing, querying, submitting, updating, uploading, using, (and accesses, accessed, asks, asked, etc.) with regard to a destination or other subject may involve intervening action such as forwarding, copying, uploading, downloading, encoding, decoding, compressing, decompressing, encrypting, decrypting, authenticating, invoking, marshalling, scheduling, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face.

Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

List of Reference Numerals

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment
102 computer system
104 users
106 peripherals
108 network
110 processor
112 computer-readable storage medium, e.g., RAM, hard disks
114 removable configured computer-readable storage medium
116 instructions executable with processor
118 data
120 kernel
122 tools, e.g., compiler
124 applications
126 display screen
128 other hardware
200 software development environment
202 software build system
204 inputs to software build, e.g., source files
206 build instructions, e.g., makefile
208 output of software build, e.g., artifacts such as executables
210 storage system
212 blocks or blobs or chunks (blobs are binary large objects)
214 version control system, e.g., file check-in check-out and repository
216 enhanced security system, e.g., access control, user authentication, circle of trust
300 DAG node
302 hash value, a.k.a. hash
304 links to other nodes
306 node type
308 node version
400 build graph
402 build target nodes, e.g., node representing an application as a transformation of inputs
404 build artifact file nodes, e.g., node representing an executable
406 chunk store
408 memory used by a chunk store; special case of memory 112
410 build chunk deduplication system
412 dedup graph module
414 dedup software
416 build interface between dedup software and build system
418 storage interface between dedup software and storage system
420 node queue or other ordering data structure
422 dedup graph
424 data structure implementing dedup graph, e.g., hash tree
426 build portion of dedup graph
428 chunk portion of dedup graph
430 chunk node in dedup graph
432 local cache holding dedup graph hashes, possibly with expiration dates
434 dedup service
436 time-based reference
438 weights assigned to computation, network transmission, or storage of artifact(s)
500 build targets represented in build graph and in build portion of dedup graph
502 files represented in build graph and in build portion of dedup graph
504 source codes in build graph
600 directory graph
602 directory node in directory graph
700 chunk in chunk store 702 binary content of chunk 704 expiration date of chunk, after which it may be removed from chunk store 800 example hash tree before modifications made by build 900 hash tree 800 after modifications are made by build 1000 deduplication process flowchart 1002 commence software build 1004 obtain dedup node(s) by shadowing part of build graph 1006 identify node(s) changed by build 1008 query chunk store interface to see if changed node(s) are present in chunk store 1010 upload changed node(s) that are not yet present with desired expiration date, or effectively upload them by extending expiration date 1100 flowchart of steps related to deduplication 1102 commence build 1104 finish build 1106 obtain at least part of a dedup graph 1108 update a dedup graph 1110 identify a node changed by build, based on change in node's hash 1112 place a node in a queue for querying whether the node with its desired expiration date is present in a chunk store 1114 query whether a node with its desired expiration date is present in a chunk store 1116 submit a node for uploading to the chunk store 1118 ask the chunk store to extend the expiration date of a node 1120 infer that a node is already present in the chunk store 1122 avoid submitting a node that is already present in the chunk store 1124 determine that a target node is already present in the chunk store 1126 determine a target node is not already present in the chunk store 1128 recursively process child nodes to determine whether they are present in the chunk store, e.g., by placing them in the query queue and getting a response from the chunk store, or by comparing their expiration dates to cached expiration dates 1130 use a local cache for dedup graph nodes, e.g., cache hashes and expiration dates of nodes that are in the chunk store 1132 use dedup software as a service 1134 deduplicate by using a local cache to avoid sending a message to a remote chunk store 1136 deduplicate by avoiding storing an additional copy of chunk content in the chunk store 1138 deduplicate by using an expiration date, e.g., extend the expiration date of a chunk that is already in the chunk store 1140 deduplicate by avoiding a duplicate storage operation or a duplicate storage copy or both 1142 upload a chunk to the chunk store 1144 extend an expiration date in the chunk store 1146 download from the chunk store 1148 determine relative priority of two or more of: (re)computation, network transmission, storage Operating Environments With reference to FIG. 1, an operating environment 100 for an embodiment, which may be part of a cloud or datacenter or other computing facility, includes at least one computer system 102. The computer system 102 may be a multiprocessor computer system, or not. An operating environment may include one or more machines in a given computer system, which may be clustered, client-server networked, and/or peer-to-peer networked within a cloud 100. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users.

A user interface may include a command line interface, a graphical user interface (GUI), natural user interface (NUI), voice command interface, and/or other user interface (UI) presentations. Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. A user interface may be generated on a local desktop computer, or on a smart phone, for example, or it may be generated from a web server and sent to a client. The user interface may be generated as part of a service and it may be integrated with other services, such as social networking services.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments. Other computer systems not shown in FIG. 1 may interact in technological ways with the computer system 102 or with another system embodiment using one or more connections to a network 108 via network interface equipment, for example.

Each computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, rebooting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components 128. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar hardware logic components. Unless indicated otherwise, firmware herein encompasses such hardware logic components. Components of an embodiment may be grouped into interacting functional modules based on their inputs, outputs, and/or their technical effects, for example.

In addition to processors 110 (CPUs, ALUs, FPUs, and/or GPUs), memory/storage media 112, an operating environment may also include other hardware 128, such as displays 126, batteries, buses, power supplies, wired and wireless network interface cards, accelerators, racks, and network cables, for instance. A display 126 may include one or more touch screens, screens responsive to input from a pen or tablet, or screens which operate solely for output.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

The kernel 120, tools 122, applications 124, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation.

In some embodiments, the computing system 102 includes at least one of the following: a server computer, a cloud server, a datacenter server, a server configured to run multiple virtual machines, a smartphone, a tablet, a laptop, a desktop, a workstation, a video gaming system, a virtual reality system, an augmented reality system, a vehicle, an automated manufacturing system, a process control system, a robotic system, an embedded system.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Items in dashed outline form, such as peripherals 106 and screens 126, may or may not be physically present in a given embodiment, individually or in any operable combination. Items may sometimes be physically present but not be used by a particular embodiment.

Software Development Environment

Figure 2:
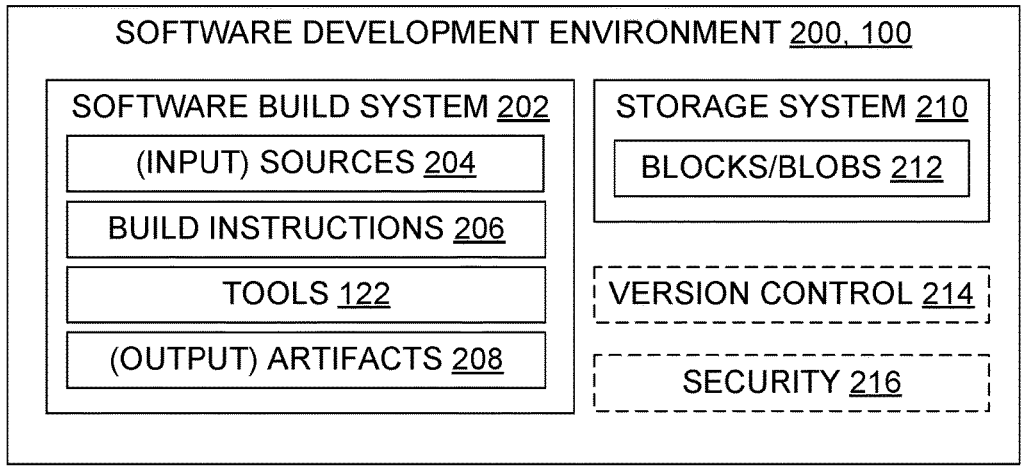
FIG. 2 is a block diagram illustrating aspects of a software development environment.

FIG. 2 illustrates aspects of a software development environment 200, which is an example of an operating environment 100. The development environment 200 includes a software build system 202 and a storage system 210. The build system 202 builds (autonomously or under developer direction) software artifacts 208 through the operation of tools 122 to transform inputs 204 into outputs 208 that include the artifacts, pursuant to instructions 206. For example, the build system 202 may operate a compiler 122 and linker 122 to build an executable 208 by transforming source code 204 and libraries as directed by a makefile 206 or other build script 206 or project file 206. More generally, the build system 202 may include continuous integration tools 122, configuration management tools 122, package management tools 122, integrated development environment software 122, or other build automation tools, whether make-based or not. Make is a build automation tool.

The storage system 210 may include local storage, network attached storage, cloud storage, or other memory 112. The digital content stored in the storage system may be allocated, freed, associated with files, and otherwise managed using chunks 212 which go by that name, or using other storage units 212 which for present purposes are interchangeable with chunks, such as blocks, segments, pages, or blobs (binary large objects). The chunks 212 may be fixed size or variable size, may be compressed or not, may be encrypted or not, and may be cached or not, in a given implementation.

The development environment 200 may include version control tools 214, such as a repository with a mechanism for checking items in or out and for tagging them with metadata such as who checked them in or out and when that occurred.

The development environment 200 may include security tools 216, such as user authentication software, access control lists, tamper detection software, and the like.

DAGs, Hash Trees, and Merkle Trees

FIGS. 3, 5, 8, and 9 illustrate aspects of graphs that are used in some embodiments. In general, the graphs used by embodiments are directed acyclic graphs (DAGs) with hashes that identify their nodes (a.k.a. vertexes) and that are based on the hashes of child nodes (which are adjacent vertexes). Hash trees used herein are one example of such DAGs, but not the only example. All trees are DAGs but not all DAGs are trees. The terms "node" and "child node" are used herein interchangeably with "vertex" and "adjacent node". Thus, use of "node" and "child" herein does not exclude embodiments which have DAGs that are not trees.

Some examples of what are now called "hash trees" are described in U.S. Pat. No. 4,309,569 to Ralph C. Merkle. However, Merkle does not use the term "hash function" or "hash" but refers instead to "one way functions". Merkle uses the trees for message authentication, whereas the present disclosure presents hash trees which shadow build trees, and hash trees with leaf nodes representing file chunks. Accordingly, although the terms "Merkle tree" and "hash tree" are sometimes used interchangeably elsewhere, herein the term "hash tree" is used in discussing embodiments.

The nodes in a hash tree have respective hash values, often simply called "hashes", but also sometimes called "hash codes" or "digests". The hashes are produced by a hash function, which is a function that maps data, often of arbitrary size, to other data of a fixed size, which is often but not necessarily a smaller size than the size of the hashed data. Hash functions may be cryptographic or not; cryptographic hash functions are designed to make it difficult to reconstruct the underlying hashed data from the hash itself. Hash functions themselves are well known, and one of skill can select a suitable hash function and hash length which provide an acceptably small probability that two different hashed data chunks will have the same hash value. In a given implementation, the hash function used may be, for example, an XOR hash function, a Fowler-Noll-Vo hash function, a Jenkins hash function, a Murmur hash function, a nonce-based hash function, a Merkle-Damgård hash function, a division-modulo hash function, or another hash function, and it may be cryptographic or non-cryptographic. In a given implementation, the hash length may be, for example, in a range from one byte to one kilobyte. One prototype uses a SHA512 hash truncated to the first thirty-two bytes. SHA512 is a Secure Hash Algorithm hash function in a SHA-2 family, with 512-bit digests, and is sometimes denoted SHA-512.

Figure 3:
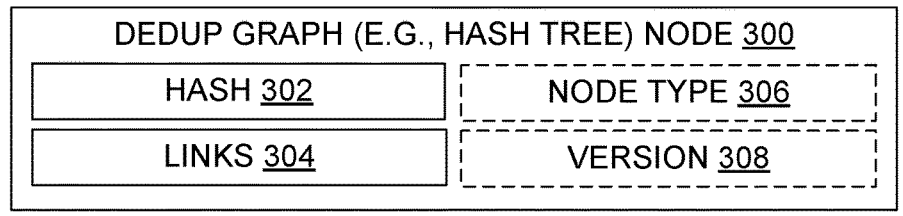
FIG. 3 is a block diagram illustrating aspects of a node suitable for use in a dedup graph.

As shown in FIG. 3, a dedup graph node 300 includes a hash value 302 which is effectively unique to the node (i.e., has an acceptably low probability of clashing by belonging to multiple nodes) and which thus identifies content associated with the node. Directed links 304 connect the node 300 to zero or more other nodes in the dedup DAG. Some embodiments include a node type 306 indicating, e.g., whether or not the node represents a file chunk. Some embodiments include an implementation version number 308.

Figure 5:
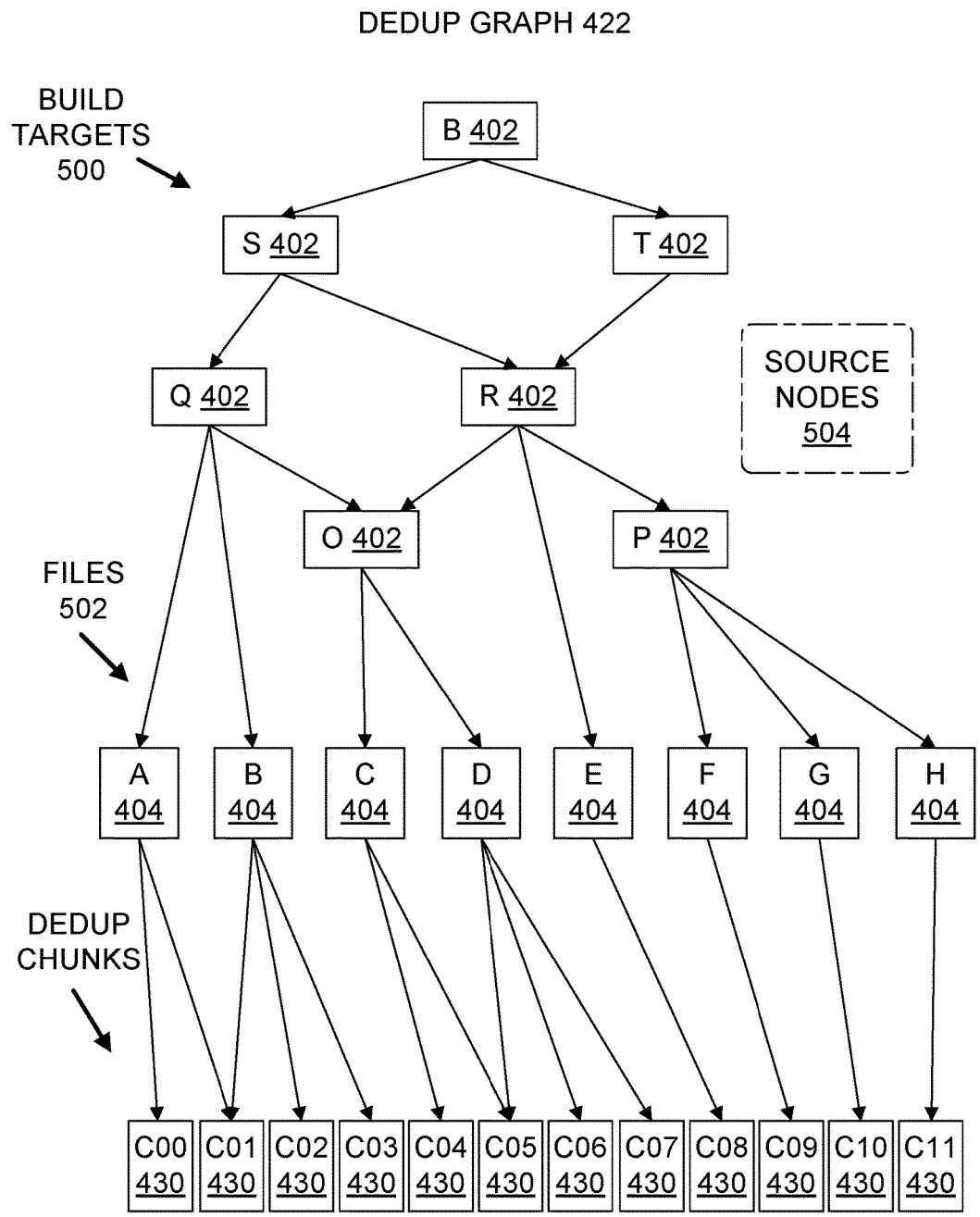
FIG. 5 is a diagram illustrating an example of a dedup graph and corresponding build graph.

FIG. 5 shows a dedup graph 422. Links 304 are indicated by arrows. Target nodes 402 and file nodes 404 each shadow nodes in a build graph, while nodes 430 are chunk nodes which do not appear in the build graph. Dedup graph nodes 402, 404, and 430 could each be implemented using a node such as node 300. Source nodes 504 represent build sources 204; these nodes 504 appear in the build graph but are not needed in the dedup graph 422. In general, a given dedup graph 422 could be implemented or re-implemented using different data structures 424, e.g., using different hash lengths or hash functions, using binary or non-binary trees, with or without version numbers 308, and so on. Accordingly, the dedup graph data structure 424 is given its own reference number herein.

Some discussions of deduplication technology described herein spoke in terms of data deduplication via a provenance graph. Thus, "provenance graph" may be encountered as another name for a dedup graph 422.

Figure 8:
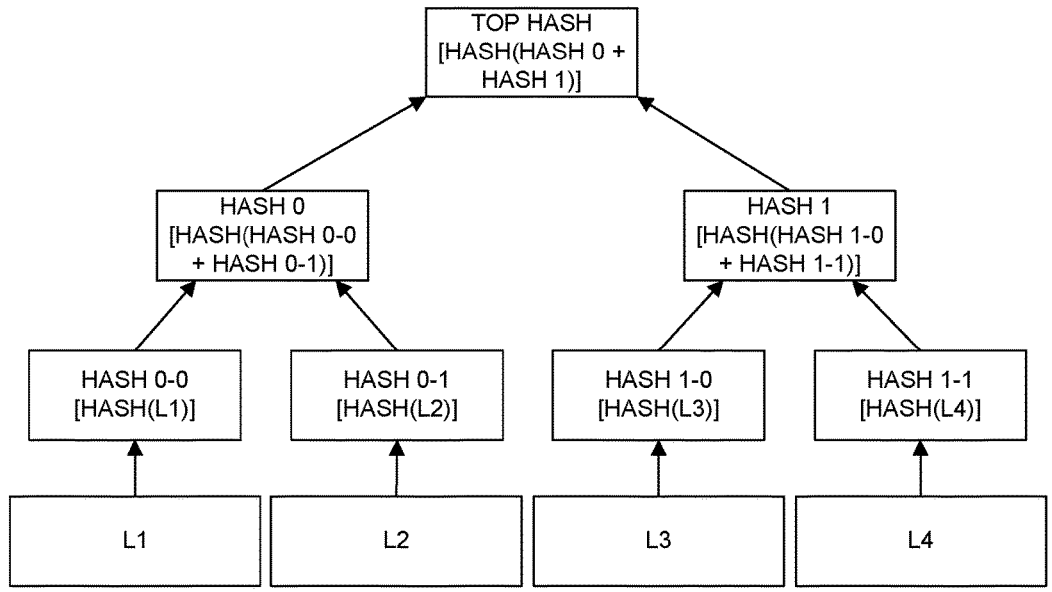
FIGS. 8 and 9 are before and after illustrations of a hash tree illustrating the impact of changes in data block which underlie the hashes of the hash tree.
Figure 9:
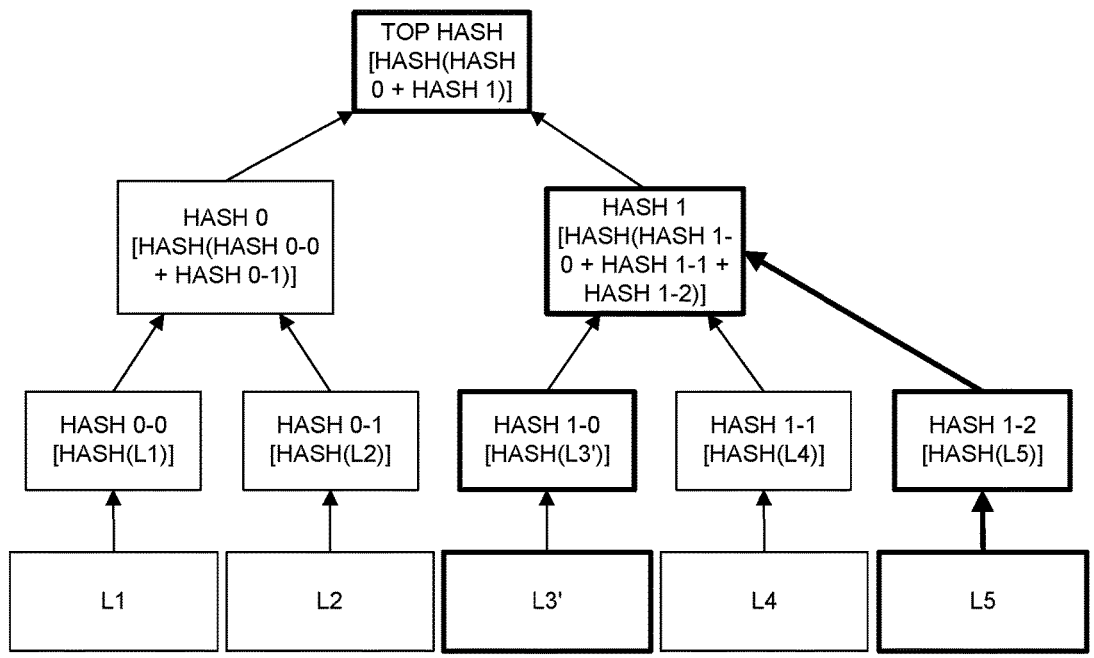

For readers unfamiliar with hash trees, FIGS. 8 and 9 illustrate the computation and use of hashes in trees to identify the impact of changes in underlying data. In FIG. 8, blocks L1, L2, L3, and L4 contain data. Each block of data is hashed by a hash function to produce a respective hash value. Hashing L1 produces the value denoted Hash(L1), which is stored in a hash tree node labeled Hash 0-0. Likewise, hashing L2 produces the value denoted Hash(L2), which is stored in a hash tree node labeled Hash 0-1, and so on for L3 and L4. Moving up one level, the two hashes Hash(L1) and Hash(L2) are concatenated and hashed in turn to produce the hash value stored in the node labeled Hash 0, and the two hashes Hash(L3) and Hash(L4) are concatenated and hashed to produce the hash value stored in the node labeled Hash 1. Finally, the two hashes stored in nodes Hash 0 and Hash 1 are concatenated and hashed to produce the top node's hash value.

Now assume that the data in block L3 is changed. This is indicated in FIG. 9 by labeling the block L3' instead of L3. Assume also that a new block of data has been added, labeled in the Figure as L5. Since the data changed in L3, a new hash value is computed, namely, Hash(L3'). Since a new block of data was added, a new hash value is also computed, namely, Hash(L5). These changes propagate up the hash tree to node Hash 1, and then into the top node, as shown in FIG. 9. Notice that several other nodes were not impacted by the changes in the data blocks: Hash 0-0, Hash 0-1, Hash 1-1, and Hash 0.

Turning back now to FIG. 5, changes in one or more of the chunk nodes 430 would similarly propagate up through the dedup graph 422 shown there, until the changes reach the top node 402 labeled "B". However, one of skill will recognize, with the benefit of the teachings and examples herein, that propagation of a chunk node change upward through a dedup graph tends to impact fewer nodes (sometimes half as many or even less) than the propagation of a corresponding chunk node change upward through a directory graph such as the directory graph 600 in FIG. 6.

Directory Graphs Versus Dedup Graphs

Figure 6:
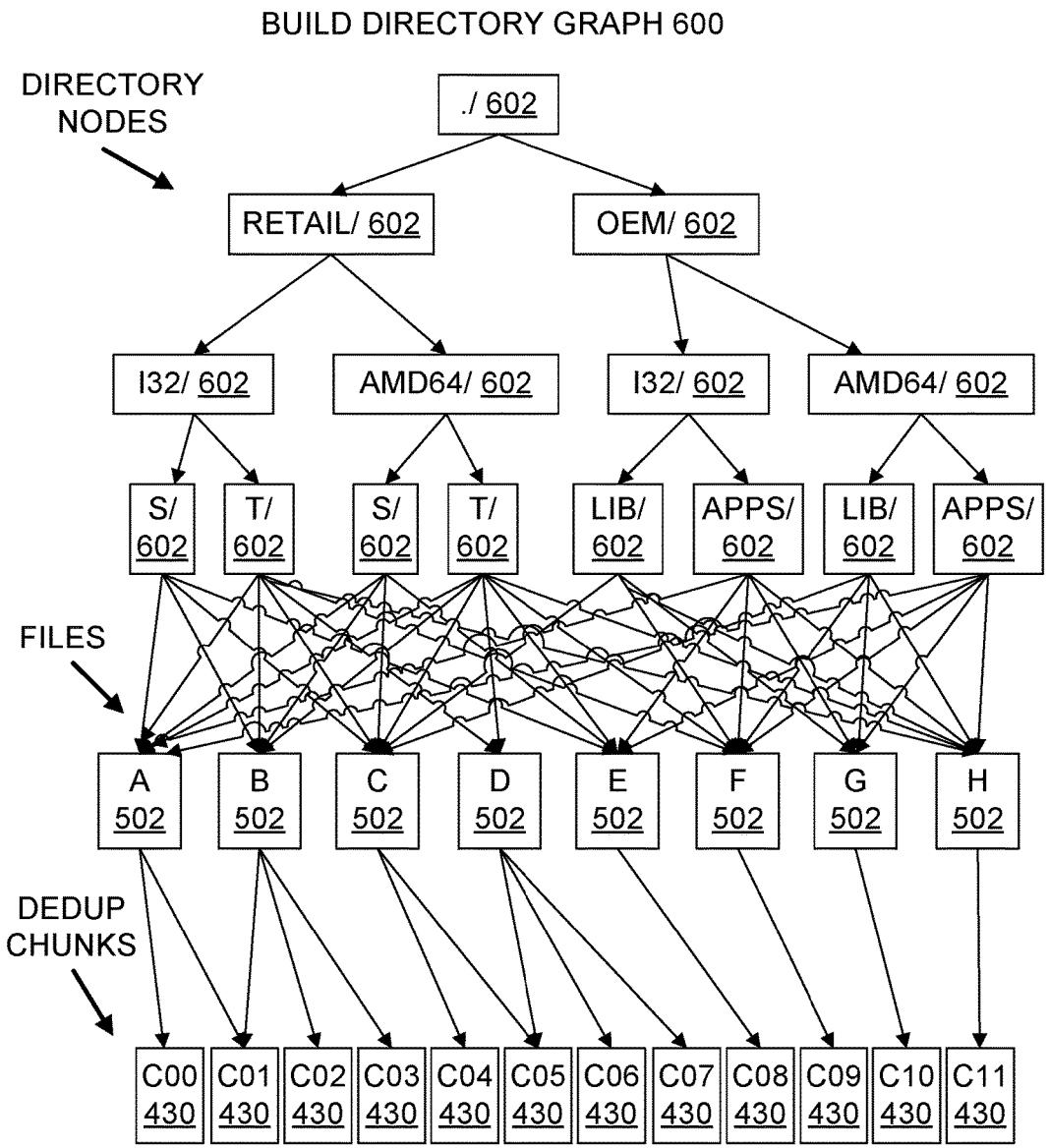
FIG. 6 is a diagram illustrating an example of a directory graph.

FIGS. 5 and 6 illustrate the same file chunks 430, denoted as C00 through C11, represented by nodes in two different kinds of graphs that can be associated with a software build. FIG. 5 shows a deduplication graph 422, also referred to herein as a "dedup graph", whereas FIG. 6 shows a directory graph 600. Dedup graphs 422 are believed to be presented publicly here for the first time. Directory graphs 600 in and of themselves are known, at least to the extent they expressly include directory nodes 602 and file nodes; chunk nodes are also shown here in the FIG. 6 directory graph, to help illustrate functional differences between directory graphs and dedup graphs.

Directory graphs are intended and configured to support software deployment. Thus, a given file may be duplicated in different directories, for deployment in different contexts such as OEM versus retail deployment, and deployment on different computing platforms. In the example shown in FIG. 6, file H has copies in an OEM/AMD64/APPS directory, in an OEM/I32/APPS directory, and in other directories, including RETAIL directories. Accordingly, a change in chunk C11 of file H will impact multiple file copies and multiple directories of the directory graph 600, including multiple directories at a given level. The level of a graph node is defined as the distance from the root node. In directory graph 600, the root node is labeled as "./". The RETAIL/ and OEM/ directories and nodes are at level 1, all I32/ and AMD64/ directories and their nodes are at level 2, and so on.

Dedup graphs, by contrast, are intended and configured to support storage deduplication. Toward that end, dedup graphs shadow—and thus leverage—the dependencies of build graphs. This characteristic of dedup graphs mitigates against node duplication and change propagation proliferation in dedup graphs. In the example shown in FIG. 5, for instance, there is only one link from node H to the next level up (node P), and only one link from there to the next level up (node R). There are two links to the level above that (from R to S and T), but even so, dedup graphs tend to have less node duplication and tighter leaf-to-root path bundles than directory graphs. As a result, a change in a file chunk, e.g., C11, will tend to impact fewer nodes in a dedup graph than a corresponding change in a directory graph. In the examples of FIGS. 5 and 6, for instance, a change in dedup graph node C11 impacts that node and six other nodes (H, P, R, S, T, B), whereas a change in directory graph node C11 impacts that node and at least fourteen other nodes (all nodes except the other file nodes A through G, and the two S/ nodes). So in this instance, more than twice as many nodes are impacted by the chunk change in the directory graph than in the dedup graph.

Integration of Deduplication, Build, and Storage

Figure 4:
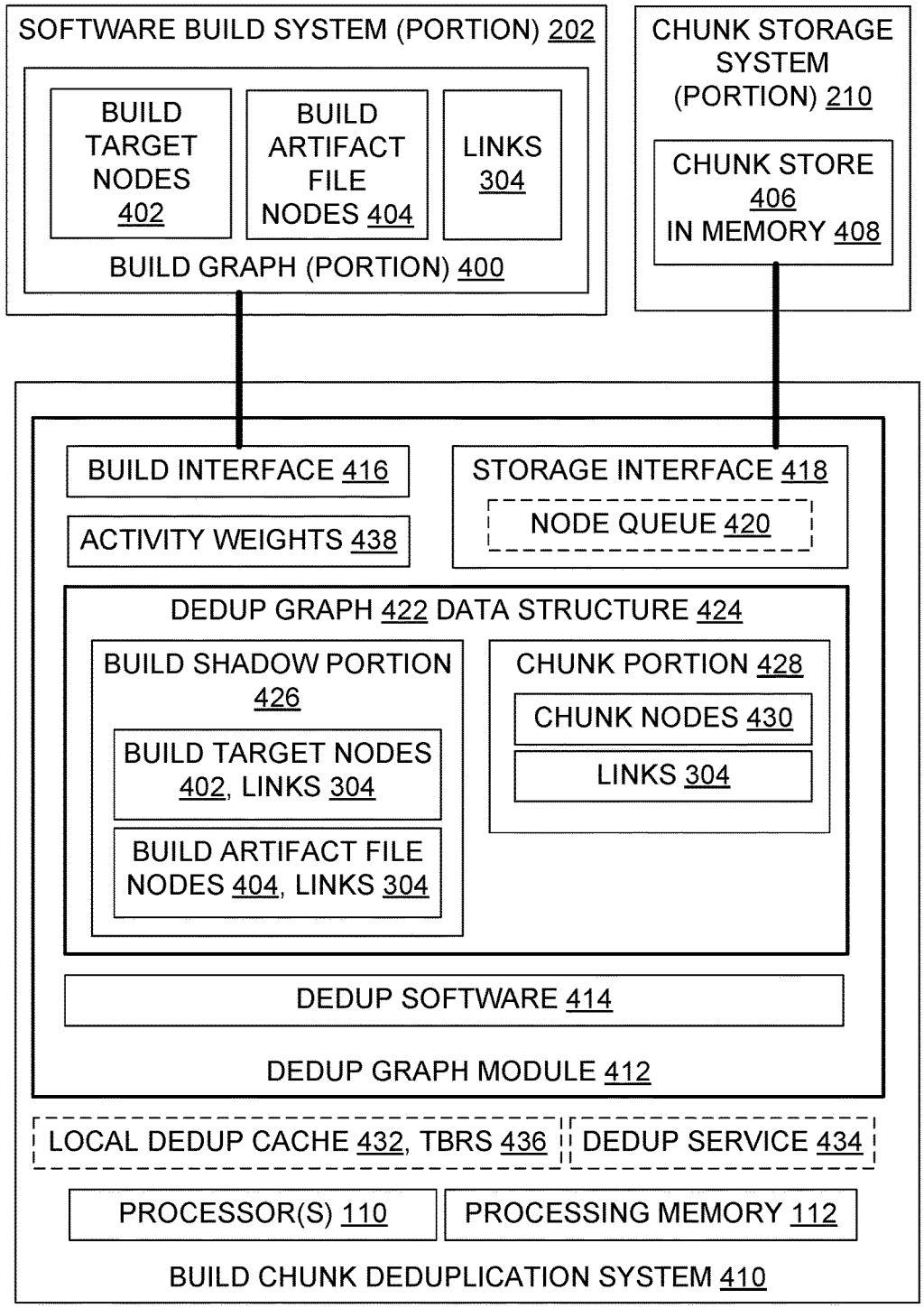
FIG. 4 is a block diagram illustrating aspects of a deduplication architecture which includes a build chunk deduplication system that is integrated via interfaces with a software build system and with a chunk storage system.

FIG. 4 illustrates aspects of architectures in which build, deduplication, and storage systems are functionally and structurally integrated. In this example, the systems are functionally integrated in that creations and modifications of a build graph 400 in a build system 202 drives shadowed creations and modifications of a dedup graph 422 in a dedup system 410, and also in that identification of changed nodes in the dedup graph 422 of the dedup system 410 drives queries and updates to the storage system 210. The systems are structurally integrated by a build interface 416 and a storage interface 418, and by the structural overlap between the build graph and the dedup graph.

Although the integration of these systems provides context which may assist in understanding claims presented, and although aspects of integration may be referenced for context in claims presented, all claims presented are directed solely to aspects of deduplication or aspects of the deduplication system itself, unless expressly stated otherwise. For example, a claim which recites a dedup system that includes dedup software merely having access to a build graph does not include the build graph itself as claimed subject matter and is not directed to the build graph itself. It merely references the build graph for context. By contrast, a claim which recites a dedup system that includes dedup software and also recites that the claimed subject matter includes a build graph which is accessible to the dedup software, would be directed to the build graph itself as well as being directed to the dedup software. It is understood that enablement and other disclosure requirements pertain to claimed subject matter; they do not extend to referenced but unclaimed subject matter.

In this example, a build system 202 includes tools, build instructions, and other items shown in FIG. 2, and also includes a build graph 400 which represents build dependencies. The build graph 400 is not necessarily complete or static. The example build graph 400 includes a root node and intermediate nodes, which are collectively designated in this example as build target nodes 402. The example build graph 400 also includes leaf nodes, designated here as build artifact file nodes 402. The example build graph nodes are connected to one another by directional links 304; the build graph is typically a directed acyclic graph (DAG). Build graphs 400 themselves, their construction, and their use in directing a build are familiar to one of skill in the art. In particular, one of skill will understand that build graphs 400 generally include source nodes 504, and that build graphs 400 do not include chunk nodes 430.

Figure 7:
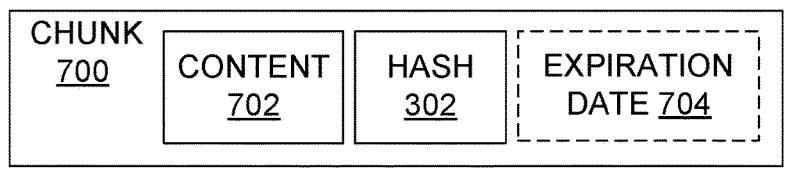
FIG. 7 is a block diagram illustrating aspects of a chunk in a chunk storage system.

In this example, a storage system 210 includes a chunk store 406, which stores chunk content in a memory 408. The memory 408 may be implemented as RAM, HDD, tape, or other kinds of memory, including mixed media. In particular, some chunk stores use content addressable memory 408. The memory 408 does not necessarily reside on a single machine. It may be local, remote, or a mixture thereof. FIG. 7 illustrates a chunk 700 stored in a chunk store 406. The chunk 700 includes binary content 702 and a hash 302 of the content 702. Some chunk stores 406 associate an expiration date 704 with the chunk content to facilitate memory management. After the expiration date passes, the storage space used by the chunk can be reclaimed for subsequent use by one or more other chunks. A chunk may be "stored" in such a chunk store either by adding the chunk's content 702 and expiration date 704 to the memory 408, or by extending the expiration date 704 when the content 702 is already in the memory 408. As shorthand, one may say that the chunk is present or absent when referring to the presence or absence of the chunk's binary content. Rather than using expiration dates 704, chunk stores 406 may use reference counts, back pointers, or other memory management approaches.

In this example, a deduplication system 410 includes supporting hardware, e.g., processor 110 and RAM (at least) 112. The deduplication system 410 also includes a dedup graph module 412, which contains dedup software 414, the build interface 416, the storage interface 418, and the dedup graph 422. The dedup software 414 performs deduplication processing using the processor 110 and processing memory 112. Deduplication processing includes, e.g., one or more of: processing to shadow the build graph by creating or updating the dedup graph 422 via the build interface, processing to identify changed chunks using the dedup graph, and processing to query and update the chunk store via the storage interface and using the dedup graph.

To assist understanding of the examples, the dedup graph 422 may be viewed as having two portions, namely, a shadow portion 426 which has corresponding nodes 402, 404 and links 304 in the build graph 400, and a chunk portion 428 which has chunk nodes 430 and links 304. The correlation between chunk nodes and respective files may be obtained, e.g., by querying a filesystem API or a chunk storage system API.

Some embodiments use or provide a build chunk deduplication system 410 which is integrated with a software build system 202 and is also integrated with a chunk storage system 210. The build chunk deduplication system includes a processor 110 having computational processing hardware, a dedup processing memory 112 in operable communication with the processor and including digital memory hardware, a dedup graph module 412, a dedup graph 422, and dedup software 414.

In this example, the dedup graph module 412 includes the dedup software 414, which resides at least partially in the dedup processing memory 112 and is executable with the processor 110. The dedup graph module 412 also includes a build interface 416 such as an API which provides the dedup software 414 with access to a build graph 400 of the software build system 202. The build graph 400 is a directed acyclic graph which defines dependencies for a software build. The dedup graph module 412 also includes a storage interface 418 such as an API which provides the dedup software 414 with access to a chunk store 406 of the chunk storage system 210.

In this example, the dedup graph 422 includes a directed acyclic graph data structure 424 that resides in and configures the dedup processing memory 112. The dedup graph has a build shadow portion 426 which has nodes and links matching at least a portion of the build graph 400 of the software build system, and in this example the build shadow portion includes at least one build target node 402 and at least one build artifact file node 404. The dedup graph 422 also has a chunk portion 428 which has chunk nodes 430 with links to at least one build artifact file node 404 of the build shadow portion. The chunk nodes with links to a given build artifact file node represent chunks 700 which collectively contain digital content 702 of a build artifact file 502 represented by the build artifact file node.

In this example, the dedup software 414 is configured to query the chunk storage system 210 through the storage interface 418 to ascertain whether chunks represented by the chunk nodes are present in the chunk store 406. Queries do not necessarily go to the chunk store each time; they may be answerable using expiration date or node information that is local to the dedup graph module, e.g., from a previous query response or in a local cache 432. The dedup software 414 is also configured to submit a chunk for storage in the chunk store when the chunk is not already present in the store 406, and configured to avoid submitting the chunk for storage in the chunk store when the chunk is already present.

In some variations, each chunk node 430 contains a respective hash 302 and the chunk store 406 includes content addressable memory 408 in which chunks 700 are stored and accessed based on the hashes. Hashes 302 may be derived from and depend on hashes of nodes lower in the dedup graph, similar to the example discussed in connection with FIGS. 8 and 9.

In some cases, the dedup graph 422 is free of source nodes 504 that are present in the build graph 400. The source nodes represent sources 204 which are inputs to the software build. It is expected that dedup graph 422 will generally be free of source nodes, since their inclusion expends resources and does not enhance deduplication of build output artifact chunk storage.

In some situations, multiple build artifact files 502 represented by respective build artifact file nodes 404 of the dedup graph are stored in a file system and are organized in the file system in a build directory graph 600 having directory nodes 602. In some of these situations, the dedup graph is free of node duplications that match directory node duplications in the build directory graph. In some, the bundle of paths from a given leaf to the root is smaller (i.e., fewer links overall or fewer links at a given level) for some, or most, or in some cases all, of the dedup graph leaf nodes than for the bundle of paths from the corresponding leaf node of a directory graph.

In some variations, the storage interface 418 includes a node queue 420. The dedup software 414 is configured to place nodes 402, 404, 430 in the node queue when querying the chunk storage system 210 through the storage interface to ascertain whether chunks represented by the chunk nodes are present in the chunk store. A chunk node in the queue 420 indicates a query for the presence of the chunk in the store 406, while a higher node 402, 404 in the queue queries ultimately for the presence of one or more constituent (i.e., descendent) chunk nodes in the store. In some of these variations, the node queue 420 is ordered to place higher priority on nodes which are higher in the dedup graph, namely, nodes which are farther from the chunk nodes, than on nodes which are lower in the dedup graph, namely, nodes which are closer to the chunk nodes or are themselves chunk nodes or leaf nodes. Knowing that a higher node is effectively present in the store implies that the descendants of that node are also present in the store, up to and including the descendant chunk nodes whose content is actually and expressly present in the store.

In some variations, the dedup software 414 is configured to ask the chunk storage system to extend an expiration date of a chunk in the chunk store. This may effectively "store" the chunk when the chunk's content is already present in the store but might otherwise be lost by memory management reclamation of memory from expired chunks.

In some variations, the dedup software 414 is configured to run chunk store querying operations and chunk upload request operations concurrently with build operations of the software build system which create build artifact files during a performance of the software build. Examples are provided elsewhere in this disclosure.

In some variations, the build chunk deduplication system 410 includes a local cache 432 which is accessible to the dedup software and which contains nodes that are also stored remotely in the chunk store. In some embodiments, the cache 432 contains chunk metadata and serves as a chunk index for checking whether a given chunk already exists in a blob store 406 or not on uploading. In environments in which developers tend to upload similar "drops" (i.e., completed builds) several times in a single day, it is expected that caching metadata for a few days (e.g., less than a week) will improve storage system performance without adversely impacting a deduplication ratio. Thus, some caches 432 have a cache entry time-to-live of one day, or two days, for example.

The deduplication ratio for data indicates the data's original size versus its size after removing redundancy. It is calculated as the size of data before deduplication (redundancy removal) divided by the size after deduplication. For example, a 4:1 deduplication ratio means 4 terabytes of data can be stored in 1 terabyte of physical memory.

In some variations, the dedup software 414 operates as a service 434 provided by a host, platform, or another entity other than the entity that provides the build system, for example.

Processes

Examples are provided herein to help illustrate aspects of the technology, but the examples given within this document do not describe all of the possible embodiments. Embodiments are not limited to the specific implementations, arrangements, sequences, flows, features, approaches, or scenarios provided herein. A given embodiment may include additional or different technical features, mechanisms, or data structures, for instance, and may otherwise depart from the examples provided herein.

Figure 10:
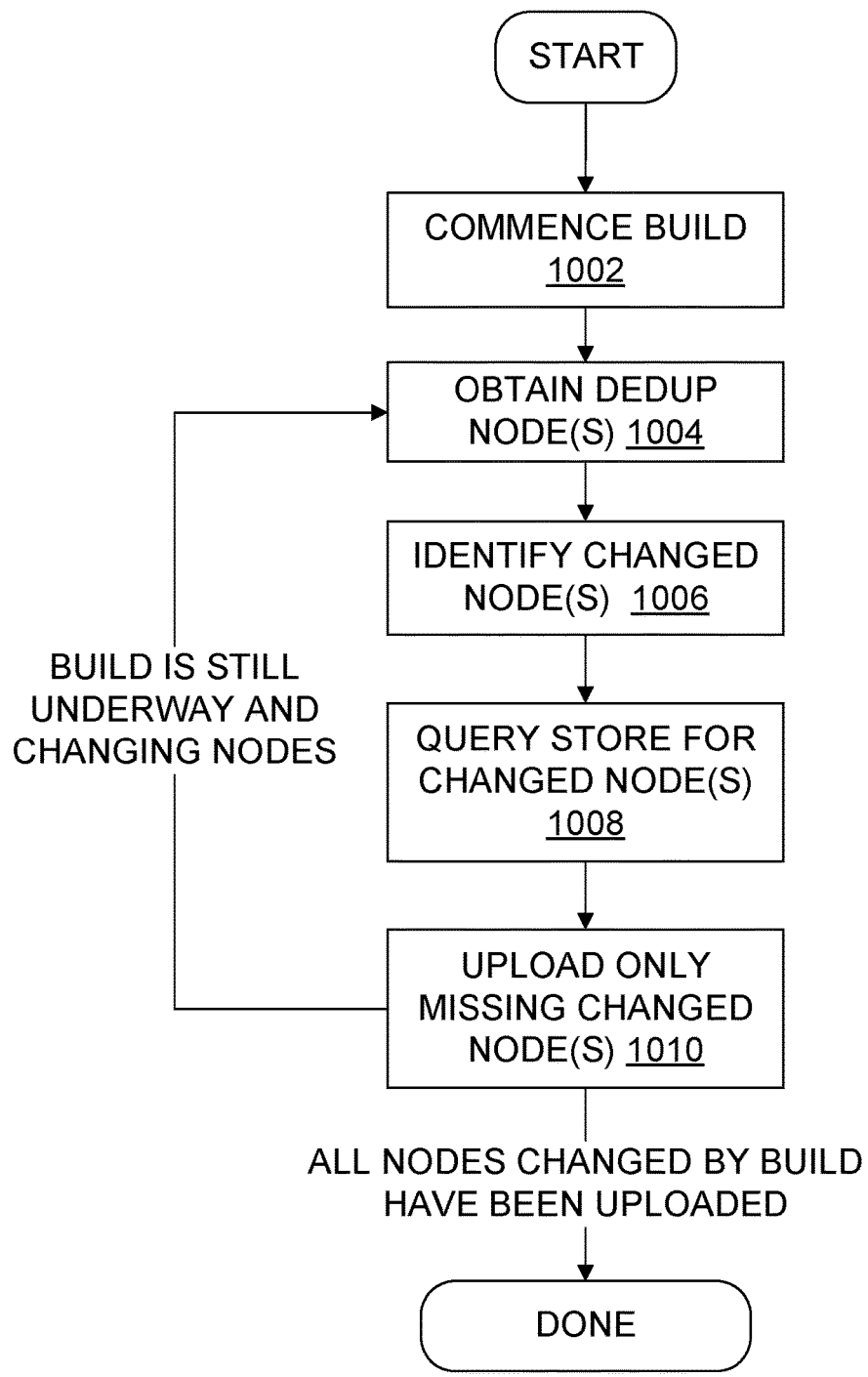
FIG. 10 is a flow chart illustrating aspects of a build chunk deduplication process.

FIG. 10 illustrates an example deduplication process 1000. A build commences 1002, either by manual command or by build automation. The deduplication system obtains 1004 one or more dedup graph nodes. By comparing hashes (possibly guided by timecode or other comparisons as an initial filter), the process identifies 1006 nodes which have been created or otherwise changed since a prior build. Then the process performs 1008 queries and node submissions to upload 1010 only the changed chunks for storage. While the build is still underway, the build graph may change, and the chunks it implicates via output artifacts may change, so dedup graph shadowing may change the dedup graph. Accordingly, the process loops back, until all nodes changed by the build have been submitted for storage in the chunk store.

Figure 11:
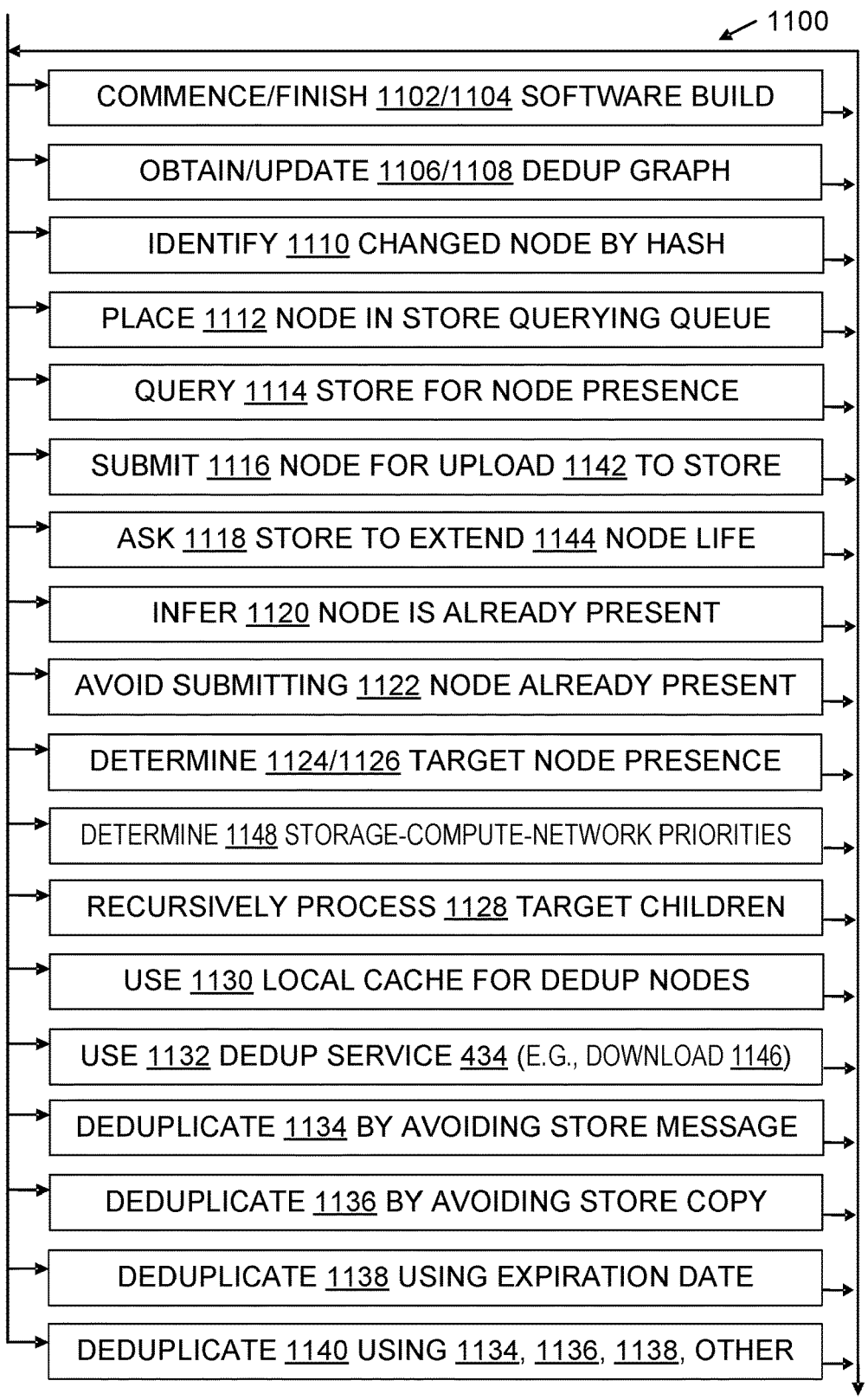
FIG. 11 is flow chart further illustrating aspects of some processes and some configured storage media that are configured for use with build chunk deduplication technology.

FIG. 11 illustrates some process and configured storage media embodiments in a flowchart 1100. Technical processes shown in the Figures or otherwise disclosed will be performed automatically, e.g., by build automation software and dedup software and chunk store software, unless otherwise indicated. Processes may also be performed in part automatically and in part manually to the extent action by a human administrator or other human person is implicated, e.g., to initiate a build. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIG. 11. Steps may be performed serially, in a partially overlapping manner, or fully in parallel. The order in which flowchart 1100 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Some embodiments use or provide build chunk storage deduplication process performed using computational processing hardware and memory. In some cases, the process includes commencing 1102 a software build, e.g., by starting execution of a build script or a project-build command. The process may then continue at least until the build finishes 1104.

In this example, the process also includes obtaining 1106 a dedup graph which resides in and configures the memory. The dedup graph includes a directed acyclic graph data structure which includes nodes with respective hashes built from other hashes in a hash tree, for instance. The obtained dedup graph may also be updated 1108 as the build continues. In this example, the dedup graph includes a build shadow portion which has nodes and links matching at least a portion of a build graph which defines dependencies for the software build, with the build shadow portion including at least one build target node and at least one build artifact file node. In this example, the dedup graph also includes a chunk portion which has chunk nodes with links to at least one build artifact file node of the build shadow portion, the chunk nodes with links to a given build artifact file node representing chunks which collectively contain digital content of a build artifact file represented by the build artifact file node.

In this example, the process also includes identifying 1110 at least one dedup graph node N whose hash has been created or changed during the software build. This may be done by checking a timestamp, or by comparing hashes of the current version and prior version of a node, or by looking for a "changed" bitflag which is cleared after each node is processed, for example. FIGS. 8 and 9 also illustrate identification of changed hashes.

In this example, the process also includes querying 1114 a chunk storage system to ascertain whether one or more chunks represented by the chunk nodes corresponding to dedup graph node N are present in a chunk store. This may be done using the storage interface 418, for example.

In this example, the process also includes submitting 1116 a chunk or dedup graph node for storage in the chunk store when a query result indicates the chunk or dedup graph node is not already present in the chunk store. This may be done using the storage interface 418, for example. In this example, the process also includes avoiding 1122 submitting the chunk or dedup graph node for storage in the chunk store when the query result indicates the chunk or dedup graph node is already present in the chunk store.

In some variations, a dedup graph node N is a build target node N, and querying 1114 the chunk storage system includes determining 1124 whether build target node N with its current hash is present in the chunk store. In some of these situations, the process determines 1124 that build target node N with its current hash is present in the chunk store, and the process thereafter deduplicates 1140 by avoiding querying the chunk storage system to ascertain whether one or more nodes below build target node N in the dedup graph are present and instead infers 1120 that said node(s) are present in the chunk store because build target node N is present in the chunk store. In some other situations, the process determines 1126 that build target node N with its current hash is not present in the chunk store, and the process thereafter recursively 1128 queries the chunk storage system to ascertain whether one or more nodes below build target node N in the dedup graph are present and also submits 1116 build target node N for storage in the chunk store.

In some variations, the process avoids 1122 submitting a node N's content for storage in the chunk store when the node N content is already present in the chunk store and the process further includes asking 1118 the chunk storage system to extend 1144 an expiration date of the node N chunk in the chunk store.

In some variations, the process is commenced by a second client to build a second version of a software target T after an earlier instance of the process was commenced by a first client to build a first version of software target T, and the process commenced by the second client determines 1124 that at least one chunk in the second version of software target T is already present in the chunk store after that chunk was uploaded 1142 to the chunk store during the earlier instance of the process that was commenced by the first client.

In some variations, the process includes using 1130 a local cache to store expiration dates of dedup graph nodes which represent binary content 702 that is present remotely in the chunk store. "Remotely" means on a different machine, e.g., in a different housing, or connected by an Ethernet or IP network connection, or both.

In some variations, the process includes downloading 1146, from a dedup service, content that is associated with a dedup graph node. Content may include binary content 702, hashes 302, and expiration dates 704, for example.

In some variations, multiple build artifact files represented by respective build artifact file nodes of the dedup graph are stored in a file system and are organized in the file system in a build directory graph having directory nodes, e.g., as illustrated in FIG. 6. In some of these cases, the number of directory nodes impacted by a change in a chunk is at least twice the number of dedup graph nodes impacted by the change in the chunk. This illustrates an efficiency advantage of dedup graphs over directory graphs when the primary concern is storage deduplication, as opposed to concerns over convenience of deployment in different contexts.

More generally, the process enhances computational efficiency in that it may perform deduplication 1140 by avoiding storing 1136 extra copies of binary chunk content in a chunk stores when a copy is already present, may perform deduplication 1138 by extending 1144 the storage lifespan of a copy that would otherwise be subject to reclamation and reuse, and may perform deduplication 1134 by avoiding messages to the remote chunk store through use of locally cached data.

In some embodiments, the process determines 1148 relative priorities of computation (or recomputation), storage, and network transmission, or relative priorities of two of those activities. This determination may be based, for instance, on weights 438 assigned to computation, storage, or network transmission in a particular situation. Weights 438 may be assigned using familiar calculations and measurements like those used in performance profilers, e.g., artifact size in bytes, network transmission time in milliseconds, processor time in cycles. For example, an instance of the process may determine that, although an artifact that is needed in order to complete a build or other transformation is present in a remote storage system 210, based on download timings and the artifact's size and user experience responsiveness guidelines and available local computing resources and the build graph, downloading the artifact has a lower priority than recomputing it locally, i.e., a network transmission weight exceeds a corresponding computation weight. That is, the determination 1148 may improve system efficiency in some situations where downloads are relatively slow and re-building a target would be faster, because the process may opt to rebuild (i.e., recompute) an artifact instead of downloading it. Conversely, when a relatively fast network connection to the remote store 210 is available, or when an artifact is cached locally or nearby, downloading can be prioritized over recomputing. Similar determinations may be made with regard to uploading a transformation result. For example, an instance of the process may assume a minimal compute capability and a minimal network bandwidth will be available to other instances of the process, and may then make 1148 compute-storage-network priority determinations based on those minimums. When the time that would be used to recompute a particular artifact using the minimal compute capability has less weight than the time that would be used to transfer the artifact to the storage and then subsequently transfer a copy from the storage over a network to another instance of the process, then the current process instance can avoid submitting the artifact for storage. As yet another example, in some systems storage 210 capacity may be limited enough that a storage weight 438 for a given artifact is greater than a (re)computation weight 438 for that artifact, and for that reason the process determines 1148 to avoid submitting 1122 the artifact for storage.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as a dedup graph 422, dedup software 414, build interface 416, and storage interface 418, in the form of data 118 and instructions 116, read from a removable medium 114 and/or another source such as a network connection, to form a configured medium. The configured medium 112 is capable of causing a computer system to perform technical process steps for storage deduplication as disclosed herein. The Figures thus help illustrate configured storage media embodiments and process embodiments, as well as system and process embodiments. In particular, any of the process steps illustrated in FIG. 10, FIG. 11, or otherwise taught herein, may be used to help configure a storage medium to form a configured medium embodiment.

Additional Details—Terminology and Efficiencies

In some examples, the build dependency graph is getting shadowed during a build. In some, the structure of the shadowed build graph (namely, the dedup graph) is then persisted in a data store 210 on the service side and in caches 432 on the client side or in proxies. Subsequent builds with a similar build graph 400 then profit from all or parts of the build graph being already shadowed in the persisted data.

Some examples use deduplication of the build dependency graph to make the shadowing of the build dependency graph more efficient. Deduplication is used for the artifacts that are the output of the build (associated with the leaves of the build graph 400), as well as the shadowed build graph (dedup graph 422) nodes themselves. The artifacts 502 are the actual payload of a build, while the shadowed build graph (dedup graph 422) is an index structure that facilitates chunk-level deduplication of the artifacts. Some examples use deduplication for the data related to this index structure, too.

Storage efficiency is promoted by innovations taught here, in terms of storage space as well as data transmission and number of I/O operations, when persisting the build artifacts/outputs. Deduplication of the build outputs is done on a chunk level (sub-file level). Build artifacts/outputs often are enormous, both in terms of the overall size and in terms of the number of items. Builds can produce millions of items/files that in total can contain dozens of gigabytes. This gives a lower bound on the size of the build graph 400. In addition, fine grained/chunk-level deduplication of the data increases the number of items that must be managed by the storage system. In particular, when the size of chunks is limited by a constant, the number of items, and thus the size of the storage index is proportional to the overall size of the data of the build outputs/artifacts. Some examples use the build graph's shadow 422 to help efficiently store and maintain this enormous index for the stored build data. Some use the same deduplication technology for the data of the build output as well as for the index data.

On completing a build, a build client faces the task of deciding which parts of the build output changed compared to previous builds and uploading the respective changed data to the storage backend 210. Without a proper index structure, a build client must check, for each single item in the build output, whether the item does already exist in the storage backend. With chunk level deduplication the number of individual items that must be checked is proportional to the overall amount of data of the build output. By deriving an index 422 from the build graph, items can be checked for change hierarchically based on build targets. When the build graph captures causal dependencies between changes in the input and changes in the output, the amount of checks to identify the changes is proportional to the amount of changes.

Under some familiar approaches, the build was stored by walking through the build dependency graph 400 and checking for changed files, then uploading the changed files as the new build. Walking through the dependency graph potentially checks every file in the build so the walk through is proportional to the number of files in the build. With the teachings herein, a hash tree dedup graph captures the dependencies and organizes the nodes to make the identification of changed files proportional to the number of changed files. The build can be stored by checking the hash tree 424 for changed files, then uploading the changed files as the new build.

Accordingly, some innovations taught herein can provide savings in the form of faster identification of changed files to upload. In addition, clients can also benefit when downloading build artifacts. By using deduplication for the shadowed build graph itself, some examples also save on space used for storing and transmitting the index 422. Operations related to lifecycle management and data consistency may also profit from the innovations.

The build dependency graph 400 captures the causal dependency between changes in the build input and the changes in the build output. In other words, changes are local with respect to the build dependency graph. This is an assumption, but it is evident from how most build systems work and can be verified empirically.

Additional Details—Expiration Dates and TBRs

Some examples involve caching of time-based references 436. In one example, data is deduplicated based on the content globally within the scope of user accounts. The same content may be produced by different sources at different times. For instance, the empty file/chunk shows up in many different situations. Or, as a second example, a widely used license for software will be included in many completely unrelated builds. As a consequence, the same deduplicated file/chunk in the storage backend can be referenced/shared by many completely unrelated sources. One may posit that a system should ensure that a deduplicated file/chunk is available if there is at least one reference to it. Therefore some examples keep track of references for files/chunks. If reference tracking is done on a per reference base, it is expensive and even affects the benefits of deduplication, since the number of reference updates would be proportional to the number of items in output of a build. In some examples discussed herein, however, this is mitigated through "time-based references" (TBR), implemented in connection with expiration dates 704.

In some examples, TBRs 436 represent a lease for an item that can only be extended but not shortened or deleted. Therefore all TBRs on a single item can be aggregated into a single value, namely some upper bound on the maximum of all TBRs for that item, which then generate the expiration date needed (keep it for as long as any referencing entity assumes it will be available). TBRs drastically reduce the overhead of reference tracking. When cached along with the identifiers for items, TBRs can also drastically further reduce the number of checks for changed build outputs.

For instance, if a build client has the information in its cache that the license file is available in the backend for one more year, the client won't have to check the existence of the file for that long. If the build client needs to store that file for less than a year there is nothing to do. If the client needs to store the file for more than a year, it just requests 1118 a longer lease on that file. If another client did so before, no service side update is required and the service would just reply to the former client with the new long TBR and the former client would update its cache with the new extended value. Otherwise, if no other client requested an extension before, the server would increase the bound on the TBRs. In this case other clients may benefit from this. On the service side support 1132 for TBRs can be implemented with a fixed (constant) limit on the frequency of updates of data for tracking TBRs. For instance, an implementation can be configured to balance the rate of TBR data in persistent storage changing with the amount of time the data is kept even though no longer referenced. By integrating the TBR value with the shadowed build dependency graph TBR values can be queried and cached very efficiently.

Additional Observations

The following discussion provides additional observations which pertain to one or more of the examples presented above.

As to build graphs, a build target may be considered to transform a set of inputs into a set of outputs. Outputs may be either intermediate outputs, that are not part of the final output of the build, or artifacts that are part of the output of the build. A build target X directly depends on a build target Y if some input of X is an output of Y. There may be other sources of direct dependencies between build targets in addition to input-output dependencies. The build graph embodies the dependencies between targets of a build which form a directed acyclic graph (DAG). The target X depends on target Y if there is an edge from X to Y in the transitive closure of the build graph. The build is the unique target that depends on all other targets in the transitive closure of build graph. The following discussion, for convenience, does not routinely distinguish between the build graph and its transitive closure.

Inputs and outputs of build targets are not part of the build graph but are linked to a build target. One may call inputs and outputs collectively "resources". Resources that only appear as inputs are sources. For present purposes, deduplication does not generally involve sources, so they are ignored in the following and the discussion pertains instead to build artifacts.

FIG. 5 includes an example of a shadowed build graph. In the example, the portion above file nodes A through H is a build graph, or more accurately, a shadow or mirror of a build graph. The nodes labeled B, S, T, Q, R, O, and P are the build targets. The file nodes A through H represent build artifacts that are linked to the respective build targets. Nodes omitted from the dedup graph include build sources 504.

The dedup graph shadows the build graph. That is, in this example the dedup graph is obtained from the build graph by adding to each node an edge for each artifact that is linked with the node. Edges are also referred to as "links". The edges in the dedup graph represent dependencies. Each artifact is made up of one or more chunks. The dedup graph contains an edge from an artifact to each of its chunks.

A chunk includes binary data of a size that is typically limited by the storage system 210 to a globally fixed upper bound.

A dedup node is uniquely identified by its child nodes and thus recursively by the DAG that it represents. In some examples, the same size restriction applies to nodes that applies to chunks; nodes can be stored as chunks so far as the storage system is concerned, just like any other data.

The dedup graph is stored in a dedup service, in this example, and parts of it may be cached by clients of the dedup service. On storage, chunks contain binary data. All other vertices of the dedup graph are stored as dedup nodes.

Dedup nodes and chunks are content addressed and stored as deduplicated single block blobs using, for example, a BlobStore API.

As a corollary from the definition of the dedup DAG it follows that each node of the dedup DAG uniquely identifies a sequence of chunks and each node is uniquely identified by a sequence of chunks and the shape of the DAG that is rooted by the node.

In one example, the dedup DAG 424 is implemented as a hash tree DAG. A dedup node is encoded as follows:
Bytes 0-1: Version/Magic number
Bytes 2-3: Child count LSB
For each child:
  Byte 0: child type (chunk=0, node=1)
  Byte 1-3: zeros [int32 alignment]
  Byte 4-35: chunk/node hash
In a variation, nodes also include a value indicating the overall size of all chunk data represented by the node. This may be useful in making determinations 1148 whether to transmit, store, or (re)compute items.

This format is used to compute the unique hash of the node. It is also used as the format for storing the node in the backend storage (BlobStore), which in this example is a content addressable storage system.

FIG. 5 includes an example of a dedup graph. In some cases, artifact nodes and chunk nodes are in the dedup graph, while target nodes and source nodes are not part of the dedup graph as such, but are relevant to the build graph. For conceptual purposes, however, the target nodes can be considered part of the dedup graph regardless of whether (a) the same memory instances are used for build graph target nodes as for dedup graph target nodes, or (b) a copy of build graph target nodes is made when obtaining the dedup graph target nodes. In other words, obtaining 1106 the dedup graph by shadowing the build graph may involve copying build graph nodes, or merely referencing them or reusing them in place, or both.

As to artifacts directory structure, the artifacts of a build are written to the file system during the build. The resulting directory structure of the artifacts is independent of the build graph. FIG. 6 shows how the artifacts of the build from FIG. 5 may be stored in the filesystem. This directory structure layout is optimized for distribution, usage, and consumption by package managers. By contrast, a build graph is optimized for tracking causal dependencies between resources of the build in order to reduce build time and for avoiding unnecessary rebuilds.

The dedup service profits from change localization properties of the build graph. By basing the dedup graph on the build graph, the dedup service leverages the engineering efforts that went into the design of an efficient build graph.

The artifact directory structure is optimized for presentation and distribution of the artifacts. In practice these optimization goals do not tend to align well with the goals of the dedup service.

In the example directory graph, if any of the chunks changes then the change would propagate to almost all directories. Also, the other way around, querying the contents of a directory often yields all chunks. Therefore the upper directory structure in the graph is redundant or not helpful as an index for chunk storage.

Furthermore, the out-degree of many low-level directories is so much larger that it may not be able to store those directories as single nodes, but only as a hierarchy of nodes. But there is no clear guidance what would be a well-suited hierarchy.

Extended Example: Upload of the Dedup Graph for a Build

The following are roughly the steps to upload the build artifacts to the dedup service.
Build:
  a) create build graph
  b) compute what needs to be rebuilt
  c) schedule build tasks and start build
Upload Artifacts:
  a) create upload-priority queue for dedup nodes. The node that is highest up in the DAG has highest priority.
  b) for each finished build target:
    a. compute dedup node and sub-dag of all related chunk nodes
    b. queue dedup nodes in priority queue for upload.
  c) for each node in upload-queue:
    a. check if node exists in BlobStore
      i. yes: adjust keep-until value 704 if needed
      ii. no:
        1. recursively upload all children of node (as needed)
        2. upload node
  d) create drop with references to
    a. the dedup node of each file in the drop,
    b. the dedup node of the build, and
    c. possibly intermediate nodes (e.g. directories in the artifact directory graph).

Example for Upload of Fresh Build

The following refers to FIG. 5, and illustrates one of multiple possible operational sequences by an embodiment involving the build graph and corresponding dedup graph of that Figure.
1. Build targets O and P are scheduled.
2. O build produces outputs C, D.
   1. creates dedup nodes C, D, O.
   2. enqueues 1112 upload for C04, C05, C06, C07, C, D, and O. O has highest priority.
3. Queue 420 starts to process O.
   1. queries BlobStore 406 for O.
   2. BlobStore reports O as missing
   3. queries BlobStore for C, D, and C04, C05, C06, C07.
   4. uploads C04, C05, C06, C07, C, D, and O, in this order. Note that an optimized implementation would squash (1.) through (3.) into a single roundtrip.
4. Build target Q is scheduled
5. Build target Q produces outputs A and B.
   1. creates dedup nodes for Q, A, B, using dedup node for O.
   2. enqueues upload of Q, A, B, C00, C01, C02, C03, knowing by inference or query that O is already uploaded.
6. Queue processes Q and its children as described above for O.
7. Build target P produces outputs F, G, H.
   1. creates dedup nodes for P, F, G, H, C09, C10, C11.
   2. enqueues upload of P, F, G, H, C09, C10, C11.
8. Build target R is scheduled
9. Queue processes P and its children as described above for 0.
10. R produces output E.
    1. creates dedup nodes for R and E.
    2. enqueues upload of dedup nodes of R, E, and C08 (knowing that C10 is already uploaded).
11. Build targets S and T are scheduled
12. Build targets S and T finish, create dedup nodes, and upload them as described above.

13. Build target B is scheduled, completes, creates dedup node, and uploads it as described above. Additionally:
   1. copy artifacts to the output directory using the directory layout shown in FIG. 6.
   2. a drop manifest is created that maps A, B, D, E, F, G, and H to their respective dedup node ids. In addition it maps the filename "/" to the dedup node id of B.
   3. the drop is uploaded the artifact drop service.
   4. drop service verifies the existence of the referenced dedup nodes and adjusts the keep-until dates as needed and creates id-references as needed.

Example for Upload of Rebuild

Now assume that after the above build was uploaded another client makes a change that causes file A to change and runs a build. Since the previous build was done by a different client, in this particular development environment the latest build has to compute all build targets and there is no content in local caches. This can proceed as follows.

1. Build targets O and P are scheduled
2. O produces outputs C, D.
   1. creates dedup nodes C, D, O.
   2. enqueues upload for C04, C05, C06, C07, C, D, and O. O has highest priority.
3. Queue starts to process O.
   1. queries BlobStore for O.
   2. BlobStore replies that O does exist.
4. Build target Q is scheduled
5. Build target Q produces outputs A and B.
   1. creates dedup nodes for Q, A, B, using dedup node for O.
   2. enqueues upload of Q, A, B, C00, C01, C02, C03 (knowing that O is already uploaded).
6. Queue processes Q and its children as described in earlier build above.
7. Build target P completes and enqueues upload of related dedup nodes and chunks.
8. While dedup nodes related to Q are still in the process of being uploaded, build targets R, T, and S are scheduled, produce results, and enqueue upload of the respective dedup nodes and chunks.
9. Build target B is scheduled.
10. Queue finishes upload of dedup nodes and chunks for Q.
11. Queue starts processing dedup nodes with highest priority, which are S and T. The queue picks, say, T, to process first, and then:
    1. queries BlobStore for T.
    2. BlobStore replies that T exists.
    3. All nodes in the dedup graph under T are removed from the queue.
12. Queue starts processing S
    1. queries BlobStore for dedup node S.
    2. BlobStore replies that dedup node S doesn't exist (but all children are available)
    3. dedup node S is uploaded.
13. Build target B completes, creates dedup node, and uploads it as described above. Additionally, operations will proceed as follows:
    1. copy artifacts to the output directory using the directory layout shown in the figure.
    2. a drop manifest is created that maps A, B, C, D, E, F, G, and H to their respective dedup node ids. In addition it maps the filename "/" to the dedup node id of B.
    3. the drop is uploaded the artifact drop service.
    4. drop service verifies the existence of the referenced dedup nodes and adjusts the keep-until as needed and creates id-references as needed.

Notes:
1. Only missing chunks and dedup nodes are uploaded.
2. When upload of low-level nodes is delayed (e.g. due to an I/O bottleneck) the upload process can skip existence check of low level nodes if high-level nodes do already exist.

Keep-Until References

If the same client would re-run the build with the results of queries to BlobStore cached, it would find that a dedup node existed already along with the guaranteed date 704 until when it will exist. In such cases a remote query message to the BlobStore can be avoided.

Download of Content for a Node

The following are roughly the steps to download the content associated with a dedup node from the dedup service, given a node id that represents some sequence of chunks.
   a) Query the node from the dedup service 434. The service returns 1132 the dedup node along with a (possibly partial) sub-graph that is rooted by the node.
   b) Check local cache for all nodes in the sub-graph of the dedup node.
   c) Download all missing dedup nodes and chunks.
   d) Assemble the data in the chunks to obtain the final data.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 10 and 11 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A build chunk deduplication system which is integrated with a software build system and is also integrated with a chunk storage system, the build chunk deduplication system comprising:
    a processor comprising computational processing hardware;
    a dedup processing memory in operable communication with the processor and comprising digital memory hardware;
    a dedup graph module comprising dedup software which resides at least partially in the dedup processing memory and is executable with the processor, the dedup graph module also comprising a build interface which provides the dedup software with access to a build graph of the software build system, the build graph being a directed acyclic graph which defines dependencies for a software build, the dedup graph module also comprising a storage interface which provides the dedup software with access to a chunk store of the chunk storage system;
    a dedup graph which includes a directed acyclic graph data structure that resides in and configures the dedup processing memory, the dedup graph comprising a build shadow portion which has nodes and links matching at least a portion of the build graph of the software build system, the build shadow portion including at least one build target node and at least one build artifact file node, the dedup graph also comprising a chunk portion which has chunk nodes with links to at least one build artifact file node of the build shadow portion, the chunk nodes with links to a given build artifact file node representing chunks which collectively contain digital content of a build artifact file represented by the build artifact file node;
    the dedup software configured to query the chunk storage system through the storage interface to ascertain whether chunks represented by the chunk nodes are present in the chunk store, the dedup software further configured to perform at least one of the following: (a) submit a chunk for storage in the chunk store when the chunk is not already present and avoid submitting the chunk for storage in the chunk store when the chunk is already present, (b) determine that chunk recomputation has priority over chunk retrieval, and avoid submitting the chunk for storage in the chunk store when the chunk is not already present, or (c) determine that chunk recomputation has priority over chunk retrieval, and submit for storage in the chunk store a description of how to compute the chunk.

2. The build chunk deduplication system of claim 1, wherein each chunk node contains a respective hash and the chunk store includes content addressable memory in which chunks are stored and accessed based on the hashes.

3. The build chunk deduplication system of claim 1, wherein the dedup graph is free of source nodes that are present in the build graph, the source nodes representing sources which are inputs to the software build.

4. The build chunk deduplication system of claim 1, wherein multiple build artifact files represented by respective build artifact file nodes of the dedup graph are stored in a file system and are organized in the file system in a build directory graph having directory nodes, and wherein the dedup graph is free of node duplications that match directory node duplications in the build directory graph.

5. The build chunk deduplication system of claim 1, wherein the storage interface comprises a node queue, and wherein the dedup software is configured to place nodes in the node queue when querying the chunk storage system through the storage interface to ascertain whether chunks represented by the chunk nodes are present in the chunk store, and the node queue is ordered to place higher priority on nodes which are higher in the dedup graph, namely, nodes which are farther from the chunk nodes, than on nodes which are lower in the dedup graph, namely, nodes which are closer to the chunk nodes or are themselves chunk nodes or leaf nodes.

6. The build chunk deduplication system of claim 1, wherein the dedup software is configured to ask the chunk storage system to extend an expiration date of a chunk in the chunk store.

7. The build chunk deduplication system of claim 1, wherein the dedup software is configured to run chunk store querying operations and chunk upload request operations concurrently with build operations of the software build system which create build artifact files during a performance of the software build.

8. The build chunk deduplication system of claim 1, further comprising a local cache which is accessible to the dedup software and which contains nodes that are also stored remotely in the chunk store.

9. A build chunk storage deduplication process performed using computational processing hardware and memory, the process comprising:
commencing a software build;
obtaining a dedup graph which resides in and configures the memory, the dedup graph including a directed acyclic graph data structure which includes nodes with respective hashes, the dedup graph including a build shadow portion which has nodes and links matching at least a portion of a build graph which defines dependencies for the software build, the build shadow portion including at least one build target node and at least one build artifact file node, the dedup graph also including a chunk portion which has chunk nodes with links to at least one build artifact file node of the build shadow portion, the chunk nodes with links to a given build artifact file node representing chunks which collectively contain digital content of a build artifact file represented by the build artifact file node;
identifying at least one dedup graph node N whose hash has been created or changed during the software build;
querying a chunk storage system to ascertain whether one or more chunks represented by the chunk nodes corresponding to dedup graph node N are present in a chunk store;
submitting a chunk or dedup graph node for storage in the chunk store when a query result indicates the chunk or dedup graph node is not already present in the chunk store; and
avoiding submitting the chunk or dedup graph node for storage in the chunk store when the query result indicates the chunk or dedup graph node is already present in the chunk store.

10. The process of claim 9, wherein dedup graph node N is a build target node N, and wherein querying the chunk storage system comprises determining whether build target node N with its current hash is present in the chunk store.

11. The process of claim 10, wherein the process determines that build target node N with its current hash is present in the chunk store, and the process thereafter avoids querying the chunk storage system to ascertain whether one or more nodes below build target node N in the dedup graph are present and instead infers that said node(s) are present in the chunk store because build target node N is present in the chunk store.

12. The process of claim 10, wherein the process determines that build target node N with its current hash is not present in the chunk store, and the process thereafter recursively queries the chunk storage system to ascertain whether one or more nodes below build target node N in the dedup graph are present and also submits build target node N for storage in the chunk store.

13. The process of claim 9, wherein the process avoids submitting a node N's content for storage in the chunk store when the node N content is already present in the chunk store and the process further comprises asking the chunk storage system to extend an expiration date of the node N chunk in the chunk store.

14. The process of claim 9, wherein the process is commenced by a second client to build a second version of a software target T after an earlier instance of the process was commenced by a first client to build a first version of software target T, and wherein the process commenced by the second client determines that at least one chunk in the second version of software target T is already present in the chunk store after that chunk was uploaded to the chunk store during the earlier instance of the process that was commenced by the first client.

15. The process of claim 9, wherein the process comprises using a local cache to store expiration dates of dedup graph nodes which represent binary content that is present remotely in the chunk store.

16. The process of claim 9, wherein the process further comprises downloading, from a dedup service, content that is associated with a dedup graph node.

17. The process of claim 9, wherein multiple build artifact files represented by respective build artifact file nodes of the dedup graph are stored in a file system and are organized in the file system in a build directory graph having directory nodes, and wherein the number of directory nodes impacted by a change in a chunk is at least twice the number of dedup graph nodes impacted by the change in the chunk.

18. A build chunk deduplication system which is integrated with a software build system and is also integrated with a chunk storage system, the build chunk deduplication system comprising:
a processor comprising computational processing hardware;
a dedup processing memory in operable communication with the processor and comprising digital memory hardware;
a dedup graph module comprising dedup software which resides at least partially in the dedup processing memory and is executable with the processor, the dedup graph module also comprising a build interface which provides the dedup software with access to a build graph of the software build system, the build graph being a directed acyclic graph which defines dependencies for a software build, the dedup graph module also comprising a storage interface which provides the dedup software with access to a chunk store of the chunk storage system;
a dedup graph which includes a hash tree data structure that resides in and configures the dedup processing memory, the dedup graph comprising a build shadow portion which has nodes and links matching at least a portion of the build graph of the software build system, the build shadow portion including at least one build target node and at least one build artifact file node, the dedup graph also comprising a chunk portion which has chunk nodes with links to at least one build artifact file node of the build shadow portion, the chunk nodes with links to a given build artifact file node representing chunks which collectively contain digital content of a build artifact file represented by the build artifact file node, wherein each chunk node contains a respective hash and the chunk store includes content addressable memory in which chunks are stored and accessed based on the hashes, and wherein the build artifacts comprise files containing executable software;

the dedup software configured to query the chunk storage system through the storage interface to ascertain based at least in part on node hash values whether chunks represented by the chunk nodes are present in the chunk store, and configured to avoid submitting the chunk for storage in the chunk store when the chunk is already present.

19. The build chunk deduplication system of claim 18, wherein the dedup software is part of a networked dedup service.

20. The build chunk deduplication system of claim 18, wherein the dedup graph comprises at least one hundred thousand nodes.

\* \* \* \* \*